(12) United States Patent
Umesawa

(10) Patent No.: US 11,706,534 B2
(45) Date of Patent: Jul. 18, 2023

(54) IMAGING SYSTEM, SERVER DEVICE, CONTROL METHOD FOR SERVER DEVICE, AND STORAGE MEDIUM

(71) Applicant: CANON KABUSHIKI KAISHA, Tokyo (JP)

(72) Inventor: Takeo Umesawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/816,500

(22) Filed: Aug. 1, 2022

(65) Prior Publication Data

US 2023/0050688 A1 Feb. 16, 2023

(30) Foreign Application Priority Data

Aug. 16, 2021 (JP) .................................. 2021-132446

(51) Int. Cl.
*H04N 23/80* (2023.01)
*H04N 5/262* (2006.01)
*H04N 23/661* (2023.01)

(52) U.S. Cl.
CPC ......... *H04N 23/815* (2023.01); *H04N 5/2628* (2013.01); *H04N 23/661* (2023.01)

(58) Field of Classification Search
CPC ... H04N 23/815; H04N 5/2628; H04N 23/661
See application file for complete search history.

(56) References Cited

U.S. PATENT DOCUMENTS

| | | | | |
|---|---|---|---|---|
| 6,018,368 | A * | 1/2000 | Kim ....................... | H04N 19/59 375/E7.176 |
| 6,381,343 | B1 * | 4/2002 | Davis ................. | H04N 1/00132 348/E17.004 |
| 10,341,743 | B1 * | 7/2019 | Tanner .................... | H04N 5/265 |
| 2005/0200911 | A1 * | 9/2005 | Saitoh ................ | H04N 1/40062 358/448 |
| 2008/0013845 | A1 * | 1/2008 | Fukuhara ............... | H04N 19/63 375/E7.04 |
| 2012/0147954 | A1 * | 6/2012 | Kasai ................. | H04N 21/4728 375/240.03 |

(Continued)

FOREIGN PATENT DOCUMENTS

| | | |
|---|---|---|
| JP | 2016-058994 A | 4/2016 |
| JP | 2018-156474 A | 10/2018 |

*Primary Examiner* — Chiawei Chen
(74) *Attorney, Agent, or Firm* — Cowan, Liebowitz & Latman, P.C.

(57) ABSTRACT

An imaging system including an imaging device 501 and a recording server 502 communicatively connected to the imaging device 501, wherein the imaging device 501 includes an imaging unit 503 that generates a video with a plurality of resolution, a dividing unit 504 that performs a division process of dividing the video generated by the imaging unit 503 into one or a plurality of tile areas and generates a tile image, and a transmission unit 506 that transmits the video to the recording server 502, wherein the recording server 502 includes a division control unit 507 that outputs an instruction to change a division method for the division process to the imaging device according to a designation frequency of an area designated on the video transmitted from the imaging device 501.

12 Claims, 8 Drawing Sheets

(56) References Cited

U.S. PATENT DOCUMENTS

| | | | |
|---|---|---|---|
| 2013/0188684 A1* | 7/2013 | Terada | H04N 19/176 375/240.02 |
| 2015/0139299 A1* | 5/2015 | Seregin | H04N 19/157 375/240.02 |
| 2015/0364159 A1* | 12/2015 | Ushiyama | G11B 27/3081 386/230 |
| 2016/0134865 A1* | 5/2016 | Amer | H04N 19/176 375/240.02 |
| 2021/0235086 A1* | 7/2021 | Sim | H04N 19/119 |

* cited by examiner

IMAGING SYSTEM, SERVER DEVICE, CONTROL METHOD FOR SERVER DEVICE, AND STORAGE MEDIUM

BACKGROUND OF THE INVENTION

Field of the Invention

The present invention relates to an imaging system, a server device, a control method for a server device, and a storage medium.

Description of the Related Art

Occasions in which users view videos provided from imaging devices such as cameras remotely have increased due to the progress of network technologies represented by the Internet. A service that allows a user to freely view his or her observation area by letting the user designate an observation area in an image of a camera capturing a certain area to cause the client side to digitally cut out the observation area and to enlarge/reduce the area, or the like to display the area is known.

However, if the client side cuts out an area from the video, and enlarges it for display, the effective resolution of the video decreases, and thus the video looks degraded. In order to overcome this problem, a group of tile videos obtained by dividing an entire video or a plurality of videos with a high resolution into a plurality of predetermined areas (tile areas) may be transmitted to a recording server. In addition, a technique of managing high scalability and a bandwidth by transmitting a tile video that is closest to an observation area designated by a user to a client is known.

According to JP 2016-58994A and JP 2018-156474A, it is possible to distribute a video corresponding to a range selected by a user by switching between videos to be distributed according to selection or a behavior of the user.

However, if a user wants to view a video with high resolution in a case where there is a significant difference between each tile group captured using an imaging device such as a camera and an area selected (designated) by a user, it is required to transmit a plurality of tile videos to the user or generate a video of an area designated by the user from a plurality of tile videos. The former action imposes a burden on the bandwidth of the user, and the latter action imposes a burden on resources of the server.

Therefore, one of objectives of the present invention to provide an advantageous technique for efficiently distributing a video of an area selected by a user.

SUMMARY OF THE INVENTION

An imaging system according to one aspect of the present invention includes an imaging device, and a server device that is communicatively connected to the imaging device, the imaging device includes at least one processor or circuit configured to function as an imaging unit that generates a video with a plurality of resolutions, a dividing unit that performs a division process of dividing the video generated by the imaging unit into one or a plurality of tile areas to generate a tile image, and a transmission unit that transmits the video to the server device, and the server device includes at least one processor or circuit configured to function as an instruction unit that outputs an instruction to change a division method for the division process to the imaging device according to a designation frequency of an area designated on the video transmitted from the imaging device.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

First, a problem of an imaging system that manages high scalability and bandwidths will be described using FIGS. 1, 2, 3, 4, and 5.

Figure 1A:
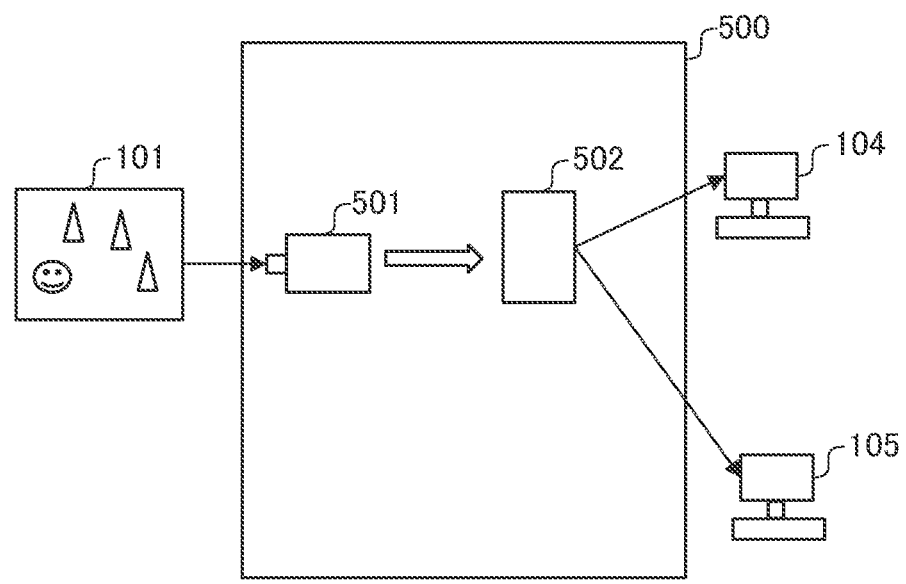
FIGS. 1A to 1D are diagrams describing an imaging system according to a first embodiment.
Figure 1B:
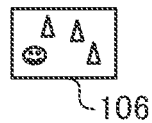
Figure 1C:
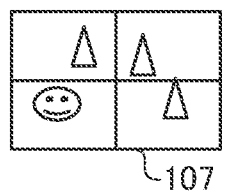
Figure 1D:
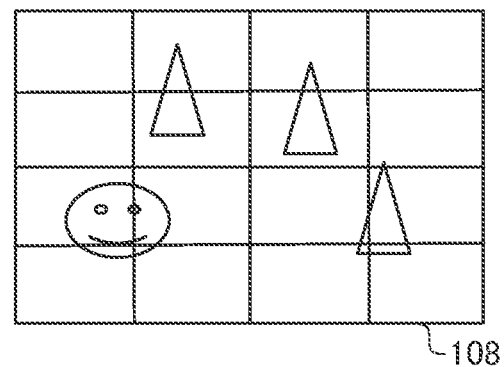
Figure 2:
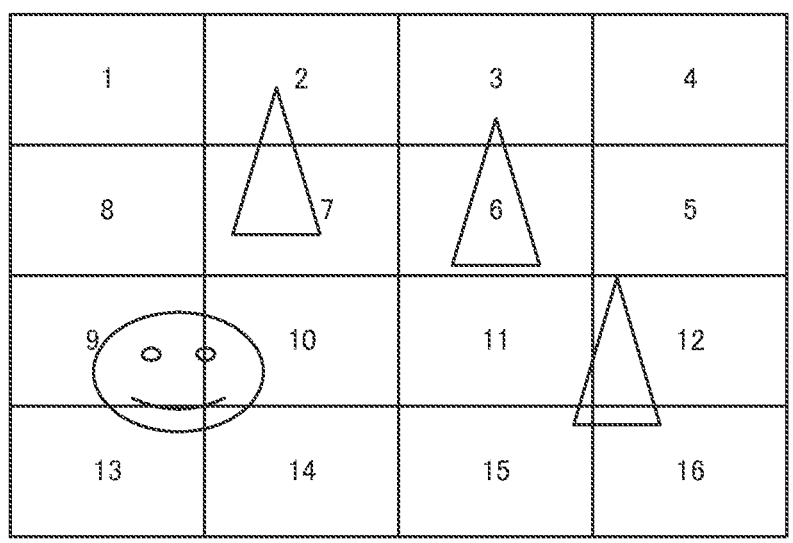
FIG. 2 is a diagram illustrating an example in which a video generated by an imaging device is divided into tiles.

FIG. 1A to 1D are diagrams describing an imaging system 500 according to a first embodiment. FIG. 1A is a conceptual diagram illustrating an example of a configuration of the imaging system 500 that manages high scalability and bandwidths. FIGS. 1B to 1C each are diagrams illustrating an example of a tile video group transmitted by an imaging device 501 to a recording server 502. FIG. 2 is a diagram illustrating an example in which a video generated by the imaging device 501 is divided into tiles.

The imaging system 500 is a system including the imaging device 501 and the recording server 502, which enables an image-capturing scene 101 to be distributed to a client 104 or another client 105 operated by a user. The imaging device 501 is communicatively connected to the recording server 502, and the recording server 502 is communicatively connected to the clients 104 and 105. Here, although the clients are disposed outside the imaging system 500, they may be incorporated into the imaging system 500. In addition, although the number of clients is limited to two for convenience in the description, it may be one or more.

The imaging device 501 captures a image-capturing scene 101 with a plurality of resolutions, generates a video (image) with a plurality of resolutions, and transmits it to the recording server 502. The image generated by the imaging device 501 is turned into, for example, an image 106 with a low resolution, an image 107 with an intermediate resolution that is higher than that of the image 106, and an image 108 with a resolution that is higher than that of the image 107.

Here, it is assumed that, as a resolution for imaging becomes higher, a layer number increases by setting the image 106 with the lowest resolution to a layer 1 image and the image 107 with the intermediate resolution to a layer 2 image. For example, the imaging device 501 may divide an image into one tile (a tile area) as the layer 1 image. The layer 1 image can be said as being non-divided because it has one tile after division.

In addition, the layer 2 image is divided into 2×2 tiles, a layer 3 image is divided into 4×4 tiles, and each of the tile images is compressed using a compression method, for example, H.264, etc., and transmitted to the recording server 502. Here, if the maximum number of layers is set to 3 and the number of division tiles in an i-th layer is set to ni, n1=1, n2=4, and n3=16 as illustrated. Here, assuming that a layer number of a layer to which a tile image generated by the imaging device 501 belongs is i and a value indicating a position of the tile is j, the tile image is expressed as Aij.

Here, a position of a tile is numbered in the raster scan order, for example, in which the upper-left tile serving as a starting point is given "1" as illustrated in FIG. 2 and the tiles on the right side are given the following numbers. Then, the recording server 502 receives and records Σni videos per one frame time. In addition, in the present specification, a layer with a higher layer number than a certain layer K is referred to as a lower layer with respect to the certain layer K, and a layer with the highest layer number is referred to as the lowest layer.

Meanwhile, the client 104 or the client 105, or both of them transmit a request for acquiring video data to the recording server 502. Upon receiving a video acquisition request from the client 104, for example, the recording server 502 first transmits an entire image-capturing scene video of the layer 1 (the image 106) to the client.

Figure 3A:
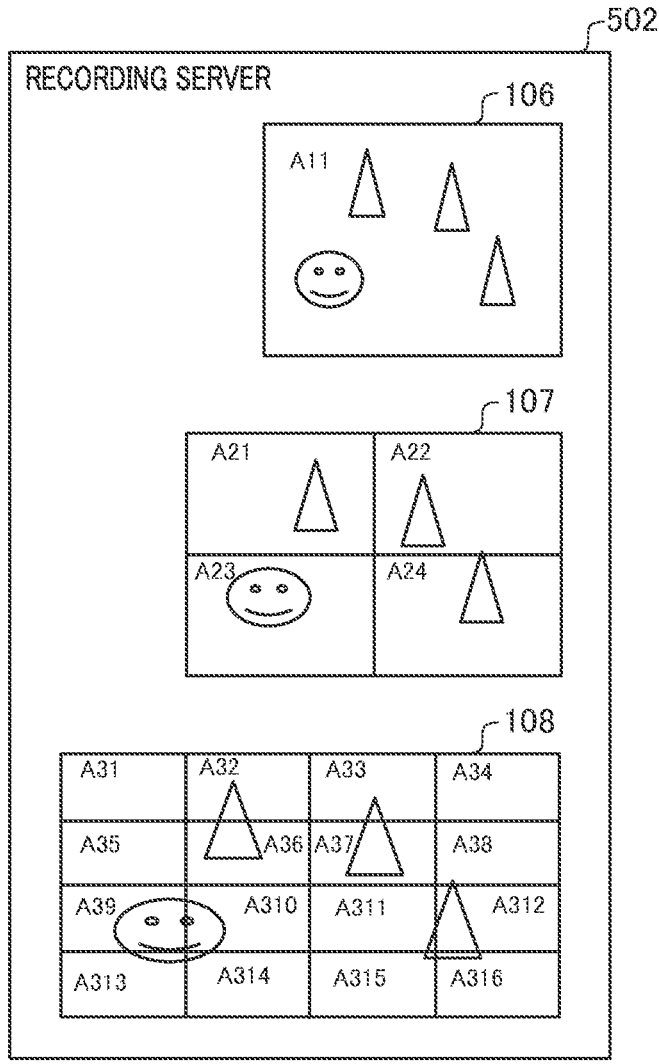
FIGS. 3A to 3D are diagrams illustrating examples of videos stored by a recording server.
Figure 3B:
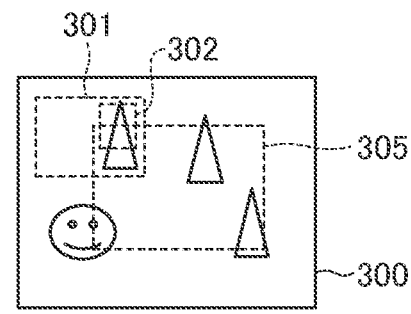
Figure 3C:
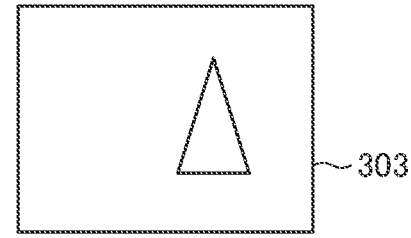
Figure 3D:
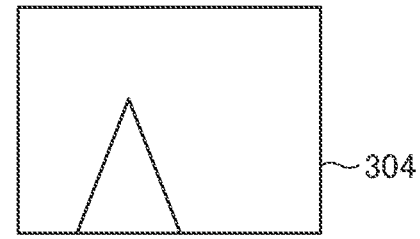

FIGS. 3A to 3D are diagrams illustrating an example of videos stored by the recording server 502. FIG. 3A is a diagram illustrating examples of videos acquired by the recording server 502 from the imaging device 501. FIGS. 3B and 3C are diagrams illustrating examples of videos displayed on client screens. In the first embodiment, the imaging device 501 divides a captured video into predetermined tile areas as illustrated in FIG. 3A, as an example.

Here, a video 300 of FIG. 3B is assumed to be a layer 1 video displayed on a display device (client screen) of the client 104. It is assumed that a user operates an input device (a mouse, a touch panel, etc.) provided in the client, which is not illustrated, to set (designate) an area 301 included in the video (here, the video 300) displayed on the client screen as an area to which the user wants to pay attention (referred to as an "observation area" below). Further, here, an observation area refers to an area designated by a user, and can also be referred to as a designated area.

At this time, the client 104 transmits a video acquisition command having information for identifying the observation area to the recording server 502. Receiving the video acquisition command, the recording server 502 transmits a video of a layer 2 tile A21 corresponding to the observation area (here, the area 301) to the client 104.

As a result, the video displayed on the client 104 changes into a video 303. In addition, when the user watching the video 300 sets an area 302 as an observation area, the recording server 502 transmits a video of a tile A32 that belongs to a layer 3 to the client 104. As a result, the video displayed on the client 104 changes into a video 304.

Further, the expression "a video of a tile A21" to be transmitted to the client will be referred to simply as a "tile image A21" below. Here, when the user sets an area 305 as an observation area, for example, the recording server 502 transmits tile images A21, A22, A23, and A24 of the layer 2. Then, the client 104 needs to decode the tile images A21, A22, A23, and A24 to cut out and display the area portion of the area 305.

This case indicates that the bandwidth of the recording server 502 and the client 104 is four times that of area designation sufficient for transmission of one tile image. In a case of many image-capturing scenes for which a user sets an area that requires multiple tile images for display (e.g., the area 305) as an observation area as described above, the efficiency deteriorates.

Thus, the first embodiment presents a system in which a tile division method is switched according to a set frequency at which a user sets (designates) an observation area (designation frequency) and the area is distributed to have a resolution that the user desires with high efficiency.

Here, in a general case where an image is divided into M×M tiles and a video is created by combining tiles, a video according to the following formula 1-1 is conceivable.

$$N_M = \sum_{k=0}^{M-1}(M-k)(M-k) = \frac{1}{6}M(2M^2 + 3M + 1) \quad \text{Formula 1-1}$$

Here, $N_M$ indicates the number of videos obtained by combining tiles when an image is divided into M×M tiles, that is, the number of videos generated by combining tiles. However, it is assumed that spatially consecutive tiles are used in the combination of tiles, and an aspect ratio of a video generated by combining tiles is equal to the aspect ratio of the tiles before being combined.

Meanwhile, a case will be considered where the number of division tiles doubles each time the number of layers increases by one. The number of videos $U_L$ for a layer L may be expressed as the following formula 1-2.

$$U_L = 2^{2(l-1)} \quad \text{Formula 1-2}$$

Here, l indicates a value of the layer. However, the number of videos for the layer 1 is set to one. Then, a total number of videos $S_L$ may be expressed as the following formula 1-3.

$$S_L = \sum_{i=1}^{L} 2^{2(i-1)} = \frac{1}{3}(2^{2L} - 1) \quad \text{Formula 1-3}$$

Figure 4:
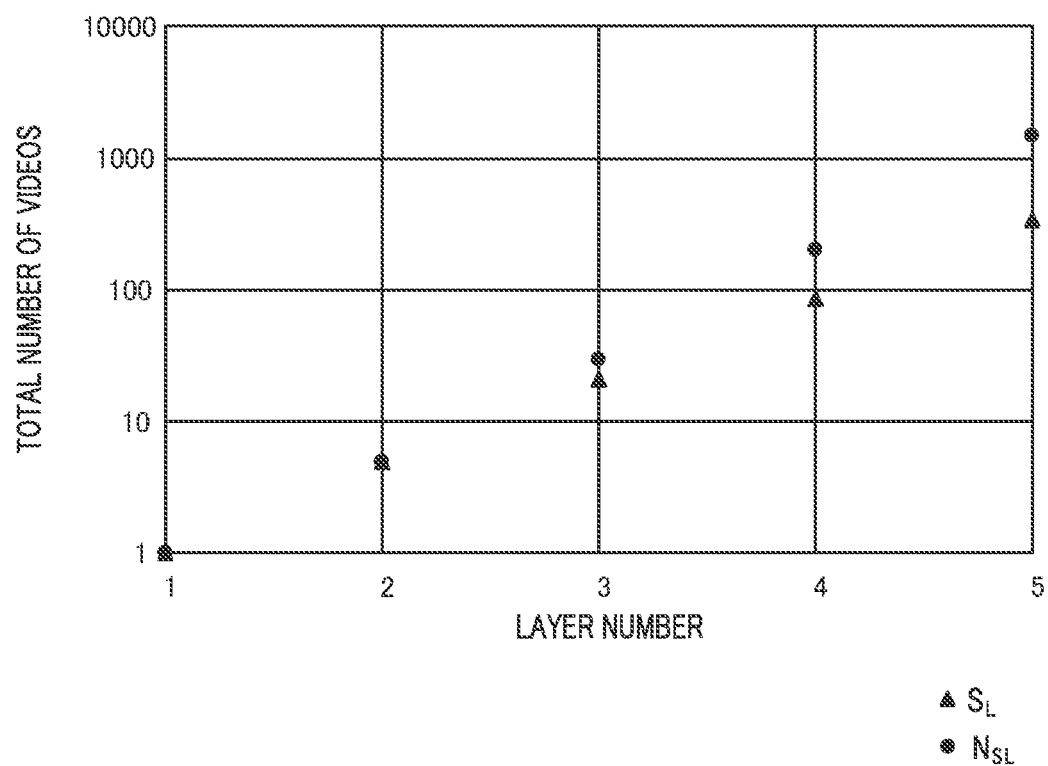
FIG. 4 is a diagram illustrating a relationship between $S_L$ and $N_{SL}$.

Here, $M = S_L = 2^{(L-1)}$ is satisfied, and a difference between the total number of videos $S_L$ when the number of division tiles doubles each time the number of layers increases by one and a total number of videos $N_{SL}$ when a video is created by combining tiles exponentially expands as a layer number L increases, as shown in FIG. 4. Further, FIG. 4 is a graph showing a relationship between $S_L$ and $N_{SL}$. In this graph, the vertical axis represents a total number of videos, and the horizontal axis represents a layer number.

Here, if $N_{SL}$ tile images are prepared in the recording server 502, a position of a tile video can be designated and transmitted to set the resolution that the user wants to a resolution corresponding to the number of images in the lowest layer, and thus distribution can be performed with good efficiency. However, because the bandwidth of the imaging device 501 and the recording server 502 is limited and the imaging device 501 has a limited capability, the number of videos to be transmitted to the recording server is also limited in reality.

Thus, a method in which the total number of videos is fixed to $S_L$, a configuration of tile images of each layer being changed according to a setting frequency of an area set as an observation area by a user and a position thereof is introduced. Here, although the system in which the number of videos increases by 2×2 times each time the number of layers increases by one has been introduced for simplification, it is merely a simple configuration, and any value may be adopted as long as the increase rate is fixed. That is, in the first embodiment, the number of videos becomes greater as the resolution becomes higher. In other words, a ratio between the total numbers of tile images in the layers is correlated to a ratio between resolutions of the layers.

Figure 5:
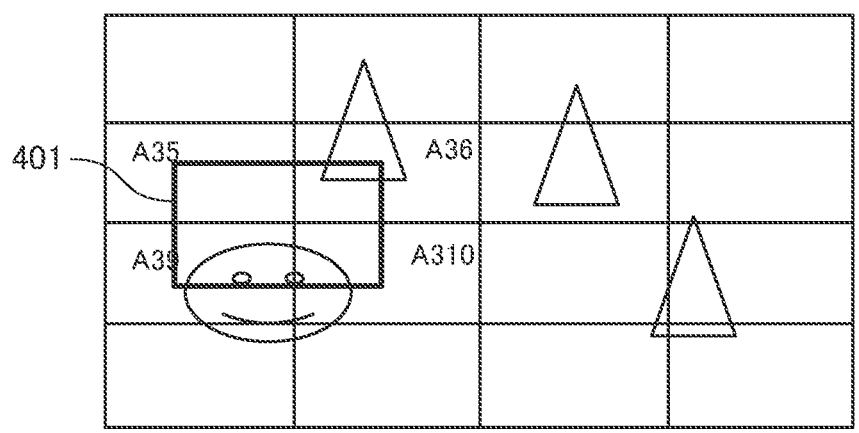
FIG. 5 is a diagram illustrating an example of an observation area according to the first embodiment.

In a case where an observation area selected by a user has a magnitude (size) of a tile image of a layer K, the recording server 502 expresses the area as a combination of videos (tiles) of a layer k+1 and stores the layer. Specifically, this will be described using FIG. 5. FIG. 5 is a diagram illustrating an example of an observation area according to the first embodiment.

In a case where an observation area selected by a user is an area 401 as illustrated in FIG. 5, for example, the observation area has the size of a tile image of a layer 2, and is stored as being composed of tile images A35, A36, A39, and A310 of a layer 3. Here, configurations of all four tiles of the layer 2 are described as reference tiles of the layer 3 that is one layer lower than the layer 2, for example, A21=(A31, A32, A35, A36).

Here, reference tiles are defined by a configuration in which an entire image-capturing area can be covered with a tile size of a layer K by each of $2^{2(k-1)}$ tiles. Reference tile configurations are, for example, in the layer 3, A21=(A31, A32, A35, A36), A22=(A33, A34, A37, A38), A23=(A39, A310, A313, A314), and A24=(A311, A312, A315, A316). The reference tile configurations are uniquely determined in all of the layers.

Here, in a case where a tile image of the layer K is expressed with tiles of the layer K+1, a combination of videos, $C_k$, is expressed by the following formula 1-4.

$$C_k = (2^k - 1)(2^k - 1) \quad \text{Formula 1-4}$$

The recording server 502 arranges areas composed of the $C_k$ combinations in the order of areas that are most frequently selected by the user, and then forms a set of areas $\Omega_k$. If the number of selection times of each area is set to $n_i$, the total number thereof is set to $m_k$, and the total number of selection times of a set $Z_k$ including $2^{2(k-1)}$ higher areas is set to $M_k$, $m_k$ and $M_k$ are expressed by the following formulas 1-5 and 1-6, respectively.

$$m_k = \sum_i^{(2^k-1)(2^k-1)} n_i \quad \text{Formula 1-5}$$

$$M_k = \sum_i^{2^{2(k-1)}} n_i \quad \text{Formula 1-6}$$

In addition, a higher probability $P_k$ is defined as shown in the following formula 1-7.

$$P_k = \frac{M_k}{m_k} \quad \text{Formula 1-7}$$

Furthermore, an area that is not covered by an area having the union of the $2^{2(k-1)}$ higher areas with respect to the entire image-capturing area is assumed as $A_k$. An average number of videos $U_k$ of the number of videos in the layer lower than the layer k that should be transmitted when an area included in $A_k$ is selected is calculated.

In addition, an expected value $E_k$ of the number of videos that should be transmitted using reference tiles is calculated. When the condition for the following formula 1-8 is satisfied, the recording server 502 transmits a command to the imaging device 501 to divide an image into tiles in a reference tile configuration. In other words, the recording server 502 transmits a command to the imaging device 501 to perform processing of dividing an image into predetermined tile areas (reference tiles).

$$E_k < (1 - P_k)U_k + P_k \quad \text{Formula 1-8}$$

In the other hand, when the condition is not satisfied, for example, the recording server 502 transmits a command to the imaging device 501 to employ the set $Z_k$ as a tile configuration. In other words, the recording server 502 transmits a command to the imaging device 501 to perform division processing with respect to an observation area.

With this configuration, one tile image may be transmitted in a case where there is a bias in a user's selection of an observation area and the user's selection of the observation area requires transmitting a plurality of tile images in the reference tile configuration. Specifically, for example, a change is made to employ a tile division configuration in which one tile image including the area 305 illustrated in FIG. 3B is sufficient when the user selects the area 305 many times, and thus highly efficient transmission can be performed.

Figure 6:
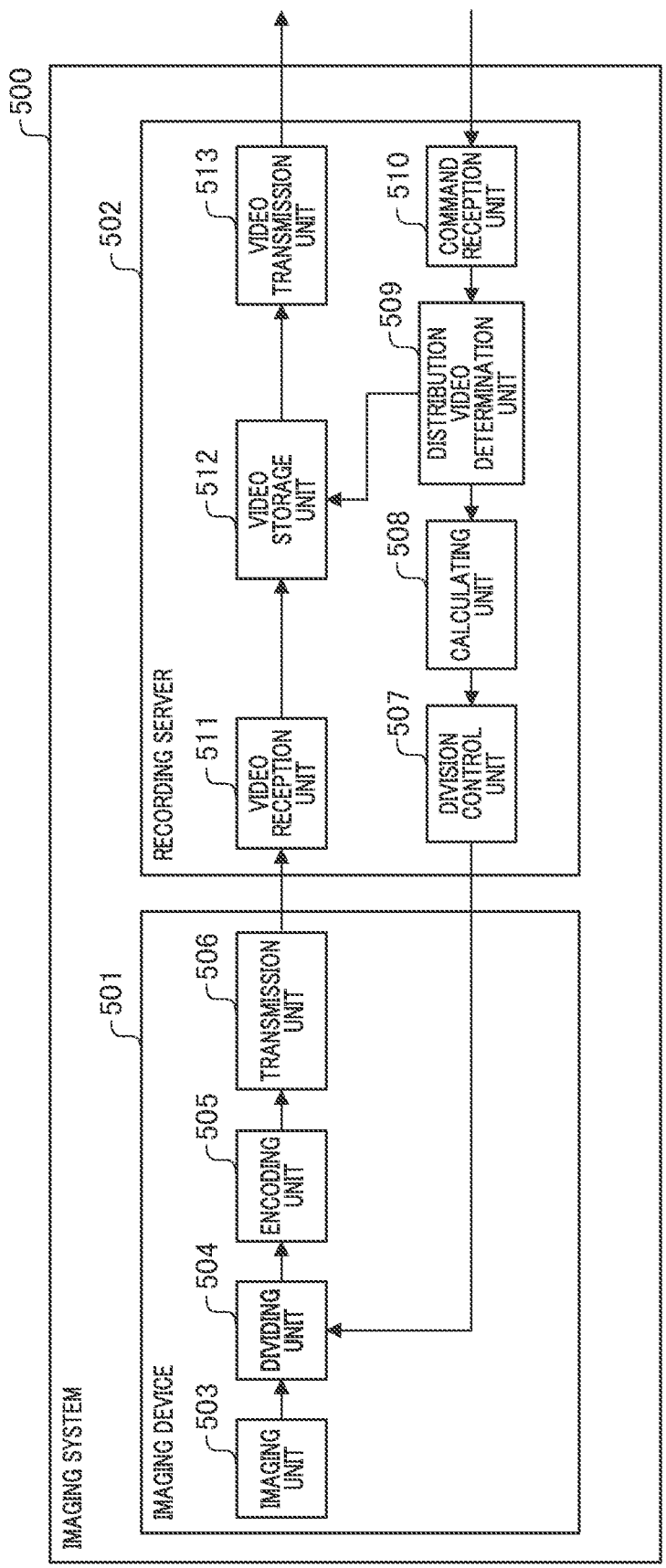
FIG. 6 is a block diagram illustrating a configuration example of the imaging system according to the first embodiment.

A configuration example of the imaging system according to the first embodiment will be introduced with reference to FIG. 6. FIG. 6 is a block diagram illustrating a configuration example of the imaging system 500 according to the first embodiment. The imaging system 500 includes the imaging device 501 and the recording server 502. Further, each of the blocks illustrated in the drawing is realized by a computer (CPU), which is not illustrated, as a control unit built in each of the imaging device 501 and the recording server 502. The constituent elements are realized by the computer performing computer programs stored in a memory. Further, the clients 104 and 105 are also assumed to include a computer likewise.

The imaging device 501 includes an imaging unit 503, a dividing unit 504, an encoding unit 505, and a transmission unit 506.

The imaging unit 503 captures a plurality of videos with varying resolutions. In other words, the imaging unit 503 generates videos with a plurality of resolutions. Here, an image with a lowest resolution is called a layer 1, and images are called a layer 2, a layer 3, . . . a layer k in an ascending order of resolution. The imaging unit 503 outputs an image of each layer to the dividing unit 504.

The dividing unit 504 divides a video into images of each layer according to the number of tiles predetermined for the layer, and a pattern (a division method), and outputs the images to the encoding unit 505. Here, the division method is set to be selected from among two types including a configuration designated by a division control unit 507, which will be described below, and a reference tile configuration in which an image is divided into the number of tiles predetermined for the layer so that the tiles cover the entire area of the image. Here, it is assumed that a predetermined number of tiles $n_i$ in a layer i is, for example, $2^{2(i-L)}$, for simplification.

The encoding unit 505 encodes a group of images input from the dividing unit 504 and outputs the result to the transmission unit 506.

The transmission unit 506 outputs the group of videos input from the encoding unit 505 to the recording server 502.

The recording server 502 includes a video reception unit 511, a video storage unit 512, a video transmission unit 513, a command reception unit 510, a distribution video determination unit 509, a calculating unit 508, and a division control unit 507.

The video reception unit 511 receives a group of videos input from the imaging device 501 and outputs it to the video storage unit 512.

The video storage unit 512 stores the group of videos input from the video reception unit 511 in a medium. Here, the medium is assumed to be, for example, a solid state drive (SSD). In addition, a video for which there has been a distribution video request from the distribution video determination unit 509 is output to the video transmission unit 513. Here, storing a video in a medium is not an essential function, and just outputting a video for which there has been a distribution video request alone may be included as a function.

The video transmission unit 513 transmits the video input from the video storage unit 512 to a requested client.

The command reception unit 510 receives a command for designating an observation area from the client, and transmits the command to the distribution video determination unit 509. The command for designating an observation area may be a command for designation using coordinates in an entire video of the layer 1, or global coordinates based on the camera.

The distribution video determination unit 509 determines an area in a video stored in the video storage unit 512 that is closest to the observation area designated by the user received by the command reception unit 510, and transfers the result to the video storage unit 512.

Figure 7A:
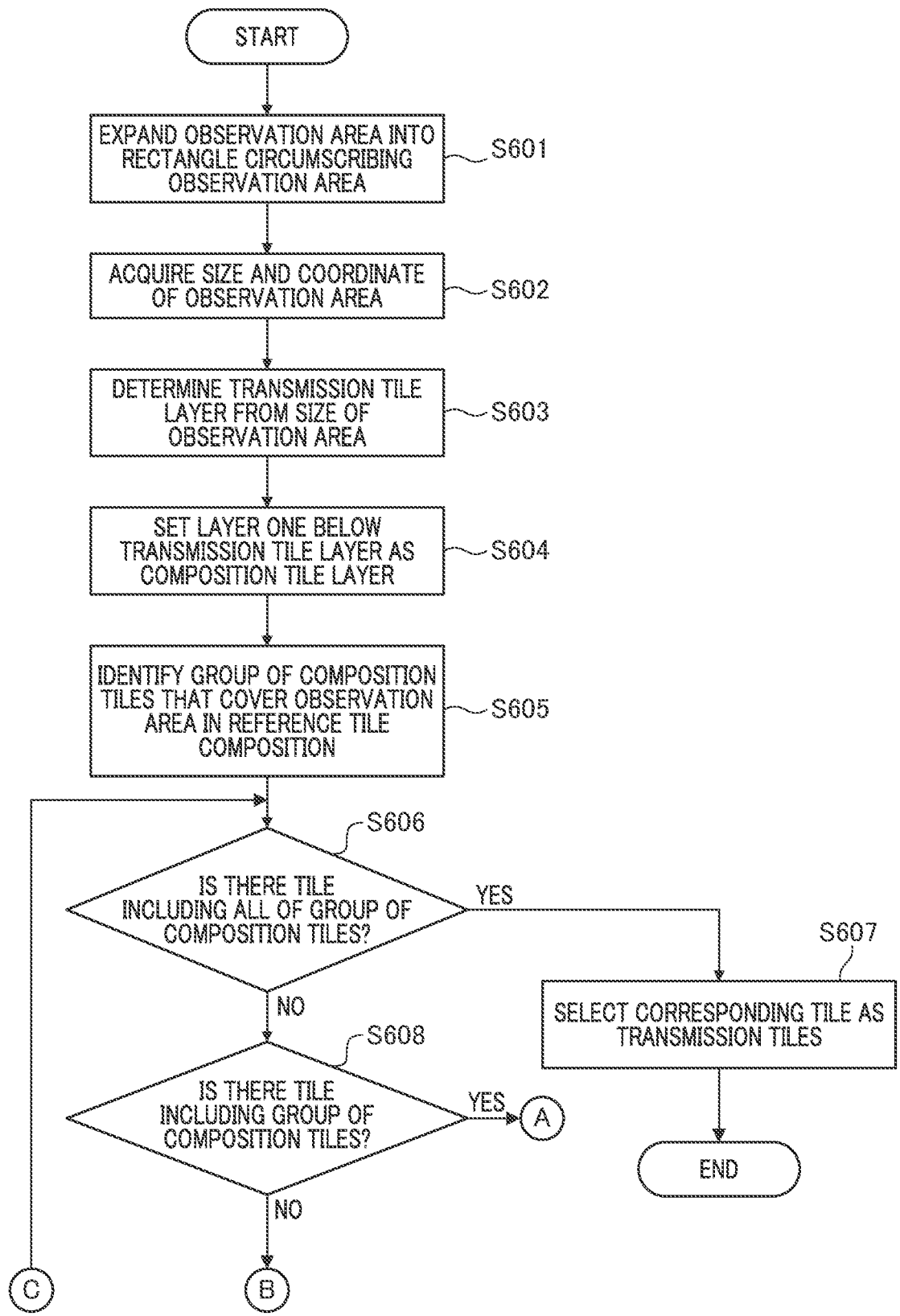
FIGS. 7A and 7B are flowcharts showing distribution video determination processing of a distribution video determination unit.
Figure 7B:
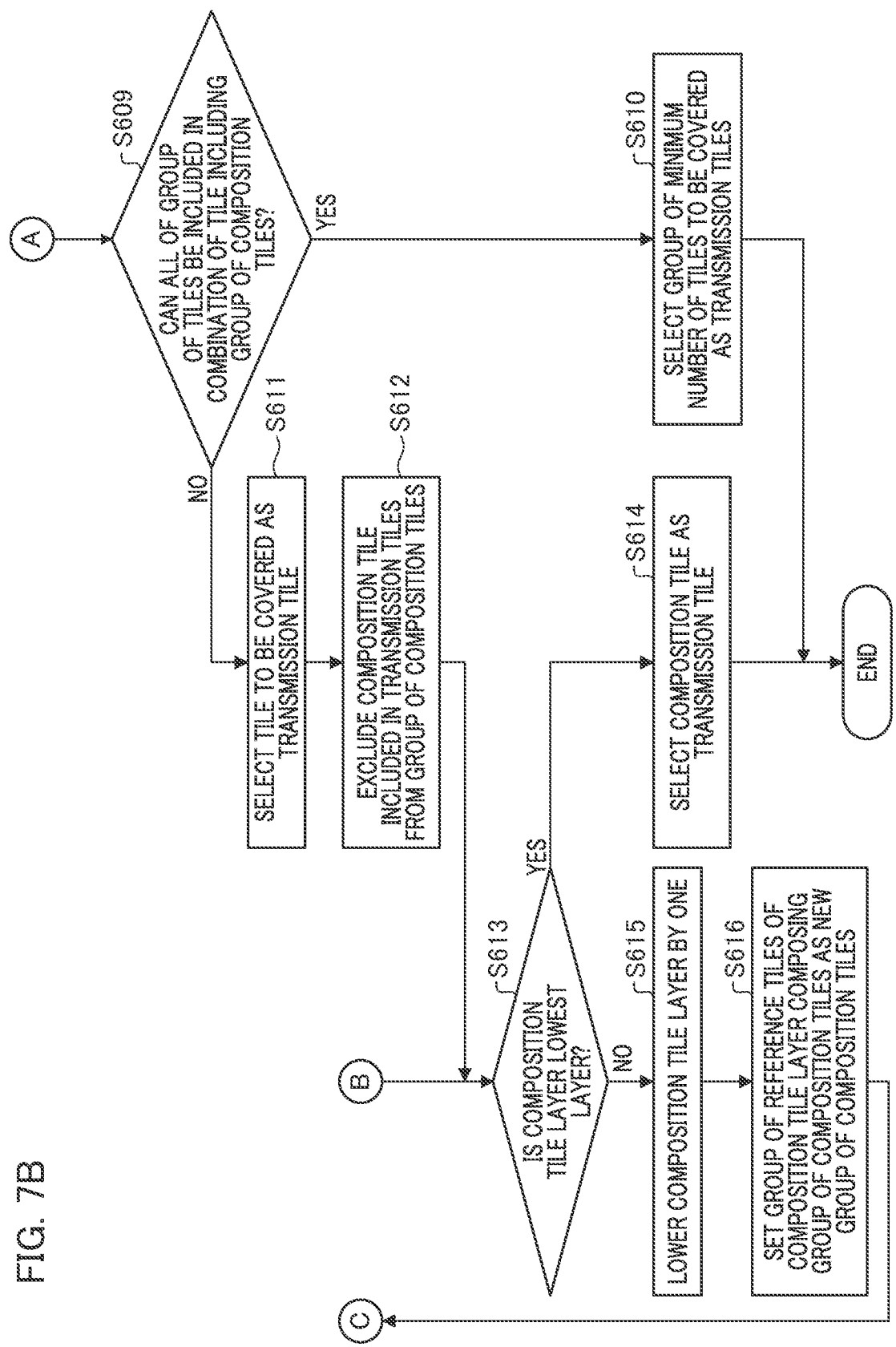

Here, a method of selecting a group of tiles that is closest to the observation area will be described using the flowchart of FIGS. 7A and 7B. FIGS. 7A and 7B are flowcharts showing distribution video determination processing by the distribution video determination unit 509. Further, each operation (step) shown in this flowchart is performed by the computer included in the recording server 502 performing a computer program stored in the memory.

When receiving an observation area designated by the user from the command reception unit 510 from the client, the distribution video determination unit 509 expands the observation area into a rectangle circumscribing the observation area in S601. The rectangle circumscribing the observation area may be configured by, for example, simply combining a maximum x coordinate value, a minimum x coordinate value, a maximum y coordinate value, and a minimum y coordinate value of the area. Here, x and y may be parallel to the horizontal and vertical sides of the image. After a rectangle circumscribing the observation area is determined, the observation area is extended into the above-described rectangle circumscribing the observation area, and the process proceeds to S602.

The size and the central coordinates of the observation area are calculated in S602, and the process proceeds to S603. Here, the coordinate system is assumed to be a coordinate system in the layer 1 image (the whole image). For simplification, the size may be the longer side length between the length of the x side and the length of the y side and axis information (information of the x side or the y side).

In S603, the side length of the same axis as that of axis information of one reference tile is compared with the side length of the observation area in order from the layer 1. This comparison is applied to a lower layer until the side length of a reference tile becomes shorter than the side length of the observation area. The layer one above the layer in which the side length of the reference tile is shorter than the side length of the observation area is determined as a transmission tile layer, and the process proceeds to S604. Further, when the side length of the observation area is shorter than the side length of the reference tile in the lowest layer, the lowest layer is set as a transmission tile layer.

The layer one below the transmission tile layer is set as a composition tile layer in S604, and the process proceeds to S605. Further, in the case where the lowest layer is a transmission tile layer, the composition tile layer is set as the lowest layer.

A group of composition tiles including a plurality of tiles that completely cover the observation area is designated in a reference tile composition of the composition tile layer in S605, and the process proceeds to S606.

In S606, it is checked whether there is a tile including all of the group of composition tiles in the transmission tile layer. If there is such a tile, the process proceeds to S607. If there is no such tile, the process proceeds to S608. One tile including all of the group of composition tiles is selected as a tile to be transmitted in S607, and then the process ends.

In S608, it is checked whether there is a tile including a group of composition tiles in the transmission tile layer. If there is such a tile, the process proceeds to S609, and if not, the process proceeds to S613.

In S609, it is checked whether the tile includes all of the group of composition tiles in combination of a tile in the transmission tile layer including the group of composition tiles. If the tile can include all of the group of composition tiles, the process proceeds to S610, and if the tile includes only some of all of the group of composition tiles, the process proceeds to S611.

Among combinations of tiles that can include all of the group of composition tiles, a combination of the minimum number of tiles is selected as a group of transmission tiles in S610, and then the process ends.

In S611, some of the group of transmission tiles are selected.

Specifically, among the tiles of the transmission tile layer including the group of composition tiles, a tile of the transmission tile layer most overlapping (having the largest overlapping area) with the group of composition tiles is determined as a transmission tile. The composition tile included in the determined tile is excluded from the group of composition tiles, and is likewise determined as a transmission tile. By performing this method until there is no tile of the transmission tile layer including the group of composition tiles, some of the transmission tiles can be determined.

In S612, the composition tile included in the transmission tiles is excluded from the group of the composition tiles, the group of composition tiles is updated, and the process proceeds to S613.

In S613, it is checked whether the composition tile layer is the lowest layer. If the composition tile layer is the lowest layer, the process proceeds to S614, and if not, the process proceeds to S615.

The group of composition tiles is selected as a transmission tile in S614, and then the process ends.

On the other hand, the composition tile layer is lowered by one in S615, and then the process proceeds to S616. The group of composition tiles is updated by setting a group of reference tiles of the composition tile layer covering the group of composition tiles as a new group of composition tiles in S616, and the process proceeds to S606.

The distribution video determination unit 509 transmits the group of transmission tiles selected using this method to the video storage unit 512 as a group of tiles that is closest to the observation area. In addition, the video storage unit 512 outputs a video for which there has been a distribution video request from the distribution video determination unit 509 to the video transmission unit 513. The video transmission unit 513 transmits the video input from the video storage unit 512 to the client.

Returning to FIG. 6, the calculating unit 508 increments the frequency of the minimum tile including all of the group of composition tiles composing the observation area and outputs the result to the division control unit 507.

The division control unit 507 determines whether to change a division method from, for example, $2^{2(k-1)}$ areas, the number of selections, the total number of selections, and an area that is not covered in a layer k designated with a number k from 1 to the total number of the lowest layer, in a descending order of the number of selections. Specifically, the division control unit 507 determines whether to divide an image in a reference tile composition or to make a tile composition based on the designation frequency effective.

Then, an instruction is output to the dividing unit 504 of the imaging device 501. In other words, the division control unit 507 functions as an instructing unit that outputs an instruction to change the division method of the division process to the imaging device 501. Here, for example, if the formula (1-8) is satisfied, the reference tile composition may be set, and if not, a tile composition based on the frequency may be set.

Further, it is desirable for the division control unit 507 to determine whether to change the division method of the division process for the videos having the plurality of resolutions in a descending order of the resolution, excluding the lowest layer, and to output the instruction to change to the dividing unit 504. With this configuration, optimization can be realized in order of videos having higher resolutions, and thus higher efficiency can be achieved.

By switching a tile division method using the above-described method, a video to be selected as an observation area more frequently can be provided with higher efficiency without changing the entire bandwidth when there is a bias in selection of a user. In addition, an area that a user designates as an observation area more frequently can be distributed with higher efficiency.

Second Embodiment

Figure 8:
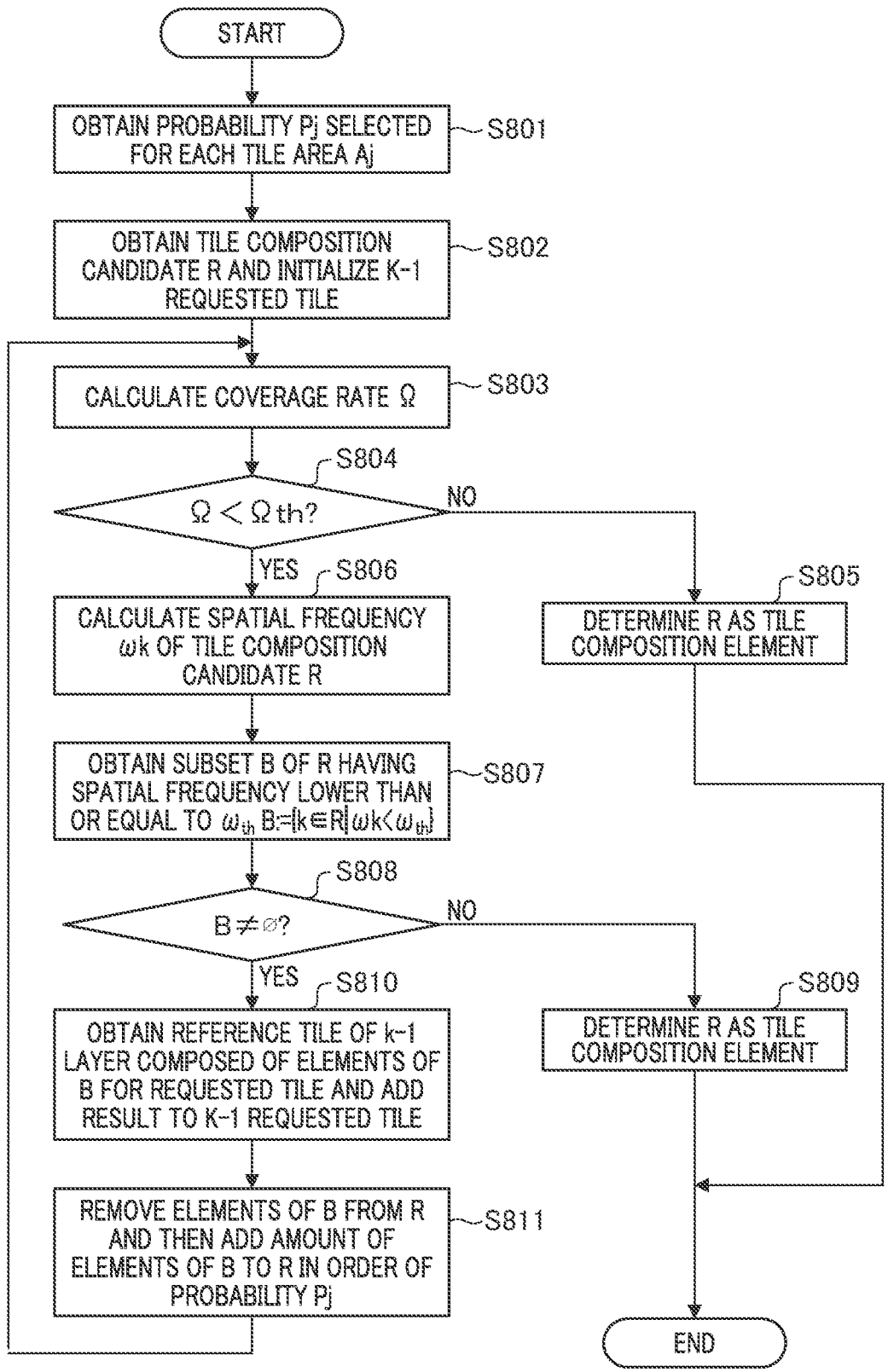
FIG. 8 is a flowchart explaining a tile division process according to a second embodiment.

As a second embodiment, an imaging device according to a second embodiment will be described with reference to FIG. 8. Similar to the first embodiment, the second embodiment proposes a system in which a tile division method is switched according to a set frequency at which a user sets an area as an observation area and the area is distributed with a resolution that the user desires.

The second embodiment is characteristic in that information of robustness evaluation of a video further photographed to determine a tile composition described in the first embodiment with respect to scaling conversion. The second embodiment is different from the first embodiment in the tile division method selected by the dividing unit 504 illustrated in FIG. 6, is the same as the first embodiment in other points, and thus the part other than a tile division method will be omitted.

A tile division method in a certain K layer that is not the lowest layer will be described using the flowchart of FIG. 8. FIG. 8 is a flowchart explaining a tile division process according to the second embodiment. Further, each operation (step) shown in this flowchart is performed by a computer included in the imaging device 501 performing a computer program stored in the memory. Further, a tile division method for the lowest layer is the same as that of the first embodiment and thus has a reference tile composition.

In S801, if a tile of the K layer composed of a group of composition tiles of the K layer (the same as a group of reference tiles of a K+1 layer) is set as Aj and the number of times in which a user selects each Aj is set as nj, a probability Pj at which each Aj is selected is calculated using the following formula 2-1, and the process proceeds to S802.

$$P_j = \frac{n_j}{\sum_{i=1}^{(2^k-1)(2^k-1)} n_i}$$ Formula 2-1

In S802, a tile composition candidate R is obtained as follows. A group of tiles Ap that is an element of a tile set requested from a lower layer is obtained, Ap is excluded from the group of composition tiles Aj, and the tiles Aj are rearranged in order of tiles having a higher probability Pj. A group of tiles Ap is added to the head of the finally rearranged tile Aj, and the tiles are numbered with A' in an ascending order from the head to the tail. Then, tiles from $A_1'$ to $A_{2^{(2k-2)}}'$ are tile composition candidates R. In addition, initialization is performed with the requested tile set to the k−1 layer as an empty set, and the process proceeds to S803. Here, the request from the lower layer is determined based on the processing result of S801 for the k+1 layer.

A coverage rate Ω is calculated using the following formula 2-2 in S803, and the process proceeds to S804.

$$\Omega = \frac{\bigcup_{i=1}^{2^{k-2}} A_i}{\bigcup_{i=1}^{(2^k-1)(2^k-1)} A_i}$$ Formula 2-2

Here, a union of tiles A and B is, for example, a set of pixels with a union of A={(x, y)|x1<x<x2, y1<y<y2} and B={(x, y)|x3<x<x4, y3<y<y4}. Here, x1, x2, y1 and y2 are minimum and maximum x coordinate values and minimum and maximum y coordinate values to determine the area of the tile A, respectively, and x3, x4, y3 and y4 are minimum and maximum x coordinate values and minimum and maximum y coordinate values to determine the area of the tile B.

In S804, the coverage rate Ω is compared with a certain threshold $Ω_{th}$. If the coverage rate Ω is lower than the certain threshold $Ω_{t}h$, the process proceeds to S806, and if not, the process proceeds to S805. Here, the threshold $Ω_{th}$ may be an arbitrary value, for example, 0.5.

In S805, a tile composition candidate R may be employed as a composition tile to be used to divide tiles in the K layer, and the process ends.

A spatial frequency of a tile that is an element of the tile composition candidate R composed of tiles from $A_1'$ to $A_{2^{(2k-2)}}'$ is calculated in S806, and the process proceeds to S807. Here, the frequency of each tile is set to ($\omega_1$, $\omega_2, \ldots, \omega_{2^{2(k-1)}}$), and the spatial frequency may be assumed as a spatial frequency in the horizontal direction for simplification, for example.

A frequency $\omega$ that is lower than the frequency of the threshold $\omega_{th}$ is obtained to gain a subset B of the tile composition candidates R in S807, and the process proceeds to S808. Further, $\omega_{th}$ is a spatial frequency at which no deterioration in image quality occurs due to scaling conversion. Because a system in which the resolution of one tile is set to be equal in each of the layers is considered for simplification, the value may be, for example W/4 in this case. Here, W is the number of pixels of the horizontal side of a tile.

It is evaluated in S808 whether the obtained subset B is an empty set. If the subset B is an empty set (No), the process proceeds to S809, and if not (Yes), the process proceeds to S810.

In S809, a tile composition candidate R may be employed as a composition tile to be used to divide tiles in the K layer, and the process ends.

A tile of the subset B is obtained as a composition tile, and if a reference tile of the K−1 layer does not overlap an element of a K−1 requested tile set, the reference tile is added to the K−1 requested tile set in S810, and the process proceeds to S811.

In S811, the elements of the subset B are removed from the tile composition candidates R. Then, NB elements in the same number as those of the subset B can be input to the tile composition candidates R of the K layer. Thus, the same NB elements are extracted from the set obtained by subtracting the tile composition candidates R from the group of composition tiles of the K layer in a descending order of the probability Pk, they are set as new tile composition candidates R in addition to the tile composition candidates R, and the process proceeds to S803.

An effective tile composition can be determined using the above-described method until the coverage rate $\Omega$ exceeds the threshold $\Omega_{th}$ or there is no tile set without deterioration even it is represented on a higher layer. By switching a tile composition, a reference tile, and a tile division method determined using the above-described method, a video to be selected as an observation area at a higher frequency can be provided with higher efficiency without changing the entire bandwidth when there is a bias in selection of a user.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the imaging system, or the like through a network or various storage media. Then, a computer (or a CPU, an MPU, or the like) of the imaging system, or the like may be configured to read and execute the program. In such a case, the program and the storage medium storing the program configure the present invention.

This application claims the benefit of Japanese Patent Application No. 2021-132446 filed on Aug. 16, 2021, which is hereby incorporated by reference herein in its entirety.

What is claimed is:

1. An imaging system comprising:
an imaging device; and
a server device that is communicatively connected to the imaging device,
wherein the imaging device includes at least one processor or circuit configured to function as:
an imaging unit configured to generate a video with a plurality of resolutions,
a dividing unit configured to perform a division process of dividing the video generated by the imaging unit into one or a plurality of tile areas to generate a tile image, and
a transmission unit configured to transmit the video to the server device, and
the server device includes at least one processor or circuit configured to function as:
an instruction unit configured to output an instruction to change a division method for the division process to the imaging device according to a designation frequency of an area designated on the video transmitted from the imaging device.

2. The imaging system according to claim 1, wherein the instruction unit further outputs an instruction to change the division method for the division process to the imaging device according to a position of the designated area on the video.

3. The imaging system according to claim 1, wherein the instruction unit further outputs an instruction to perform the division process on the predetermined tile areas or to perform the division process based on the designated area.

4. The imaging system according to claim 1, wherein a ratio between a total number of first tile images generated from a first video having a first resolution and a total number of second tile images generated from a second video having a second resolution that is higher than the first resolution is correlated with a ratio between the first resolution and the second resolution.

5. The imaging system according to claim 1,
wherein the imaging device further includes at least one processor or circuit configured to function as: a calculating unit configured to calculate an expected value of the number of videos to be transmitted to the server device according to the designated area, and
the instruction unit outputs the instruction based on the expected value.

6. The imaging system according to claim 1, wherein the instruction unit excludes a video having a highest resolution from the videos having a plurality of resolutions, determines whether to change a division method for the division processing in a descending order of resolution, and outputs the instruction to the imaging device.

7. The imaging system according to claim 1, wherein the dividing unit performs the division process based on information of an evaluated deterioration in image quality caused by scaling conversion.

8. The imaging system according to claim 7, wherein the dividing unit acquires a spatial frequency of an area obtained by division as the tile area in the evaluation of deterioration in image quality caused by scaling conversion to perform the division process.

9. The imaging system according to claim 1, wherein the imaging device further includes at least one processor or circuit configured to function as: an encoding unit configured to encode a video generated by the imaging unit and the tile image.

10. A server device that is communicatively connected to an imaging device that generates a video with a plurality of resolutions, performs a division process to divide the generated video into one or a plurality of tile areas, and generates a tile image, the server device comprising:
at least one processor or circuit configured to function as:
an instruction unit configured to output an instruction to change a division method for the division process to the imaging device according to a designation frequency of an area designated on the video transmitted from the imaging device.

11. A control method for a server device that is communicatively connected to an imaging device that generates a video with a plurality of resolutions, performs a division process to divide the generated video into one or a plurality of tile areas, and generates a tile image, the control method comprising:
 outputting an instruction to change a division method for the division process to the imaging device according to a designation frequency of an area designated on the video transmitted from the imaging device.

12. A non-transitory computer-readable storage medium configured to store a computer program to control an imaging device that generates a tile image and a server device communicatively connected to the imaging device, the medium comprising instructions for executing following processes:
 a step of generating a video with a plurality of resolutions and dividing the generated video into one or a plurality of tile areas in the imaging device; and
 a step of outputting an instruction to change a division method for the division process to the imaging device from the server device according to a designation frequency of an area designated on the video transmitted from the imaging device.

* * * * *